Aug. 26, 1924.
L. McCOY ET AL
1,506,539
CANDY MAKING MACHINE
Filed July 22, 1922
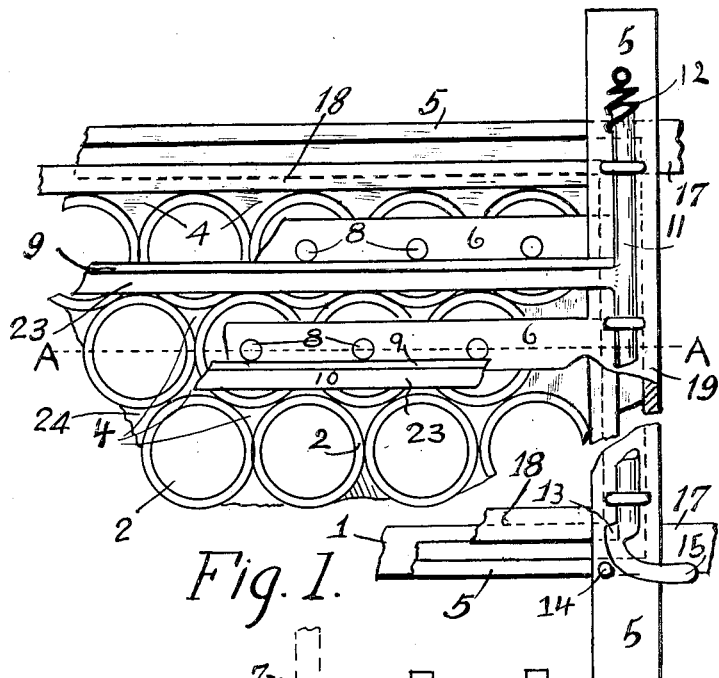
Fig. 1.
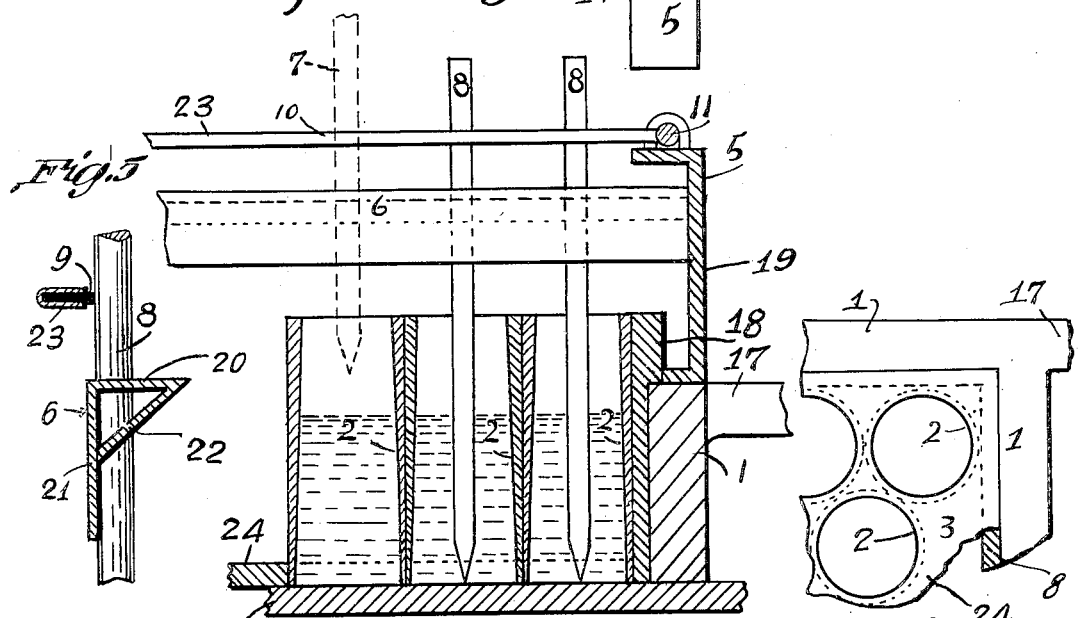
Fig. 2.  Fig. 3.  Fig. 4.
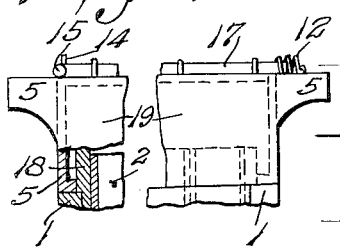
Lester McCoy
Gordon Witzke
BY
INVENTORS
ATTORNEY.

Patented Aug. 26, 1924.

1,506,539

UNITED STATES PATENT OFFICE.

LESTER McCOY, OF COUNCIL BLUFFS, IOWA, AND GORDON WITZKE, OF DENVER, COLORADO.

CANDY-MAKING MACHINE.

Application filed July 22, 1922. Serial No. 576,806.

*To all whom it may concern:*

Be it known the we, LESTER McCOY and GORDON WITZKE, citizens of the United States, and residents, respectively, of Council Bluffs, county of Pottawattamie, State of Iowa, and city and county of Denver, State of Colorado, have invented a new and useful Candy-Making Machine, of which the following is a specification.

This invention relates to machines for making candy, of the type in which the candy is formed on the end of a stick, and has for its principal object the provision of a machine of this character in which a plurality of sticks can be simultaneously inserted into a batch of candy.

Another object of the invention is to provide a candy mold of such shape that a number of molds can be placed in a limited size mold frame, and to so shape the molds that the candy may be readily removed therefrom.

A further object of the invention is to provide a series of air passages around the individual molds to facilitate the cooling of the candy therein.

A still further object of the invention is to provide a machine of this character which will register and place the sticks uniformly in the center of each piece of candy.

Other objects and advantages reside in the detailed construction of the invention, which result in simplicity, economy and efficiency, and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary plan view of a portion of the complete machine.

Fig. 2 is a fragmentary end elevation of the complete machine.

Fig. 3 is a partial cross section taken on the line A—A Fig. 1.

Fig. 4 is a plan view, looking upward at one of the corners of the machine.

Fig. 5 is a detail cross sectional view of one of the stick holding cross bars of the machine.

Let the numeral 1 designate what is technically known as a batch frame, comprising a rectangular box with open top and bottom, provided with carrying handles 17.

A mold frame 18, also rectangular in shape, sets snugly within the batch frame 1 and carries a plurality of cylindrical candy molds 2 which are rigidly secured together and to the mold frame 18. Candy molds 2 are of larger inside diameter at the bottom than at the top, in order to facilitate the removing of the hardened candy through the bottom of the molds, as will be later described. The interstices, shown at 4, between the candy molds 2, and the mold frame 18, are closed at the bottom by means of a plate 24, but are left open at the top of the mold frame to allow air to enter in and around the molds to hasten the cooling of the candy.

A rectangular stick frame 5, of size corresponding to the batch frame 1, is arranged to be placed over and around the mold frame 18 and rest upon the batch frame 1, as shown in Fig. 3. Stick frame 5 comprises a rectangular open box-like frame of proper size to fit snugly over the mold frame and rest upon the batch frame and has two vertical end plates 19, connected by a series of uniformly spaced cross bars 6, there being one cross bar for each longitudinal row of molds 2.

Cross bars 6 comprise, in cross section, a horizontal portion 20, a vertical portion 21, and a diagonal portion 22, as shown in Fig. 5. The portions 20 and 22 are perforated for the reception of candy sticks 8, each perforation registering with the center of a mold 2, while the portion 21 serves as a backing for the sticks 8 against the pressure of the stick releasing frame to be described.

Slidably mounted on the upper side of the stick frame 5, is a stick releasing frame, designated in its entirety by the numeral 10, and comprising end members, 11, one of which is mounted upon each of the end plates 19, and cross members 23 connecting with the members 11 over each of the cross bars 6. One edge of each cross member 23 is provided with a strip of felt or similar material 9, this edge being arranged to be held against the sticks 8 by means of a suitable spring 12. The resilient edge 9 accomodates any irregularities in the sticks and provides a firm grip.

One extremity of each of the end members 11 is bent to form a handle 15 and is provided with a projection, 13, adapted to engage a pin 14 and hold the cross bars 23 out of engagement with the candy sticks 8 when desired. By forcing the handle 15 to one side, the projection 13 releases from the pin 14 and allows the spring 12 to draw the cross bars into contact with the candy sticks 8.

In use, the stick frame 5 is placed upon a table or suitable supporting surface and sticks inserted in each of the perforations in the cross bars 6, the stick releasing frame being drawn back from the perforations to facilitate the insertion of the sticks. The supporting surface prevents the points of the sticks from coming below the lower edge of the stick frame. After the sticks are in place the stick releasing frame is released which firmly clamps the sticks in place. The batch frame 1 is placed upon a batch board, 3, usually a marble slab, and partially filled with hot semi-liquid candy. The mold frame is then pressed into the batch frame, forcing the candy up into the molds 2, as shown in Fig. 3. The stick frame is then placed upon the batch frame, the sticks occupying the position shown in broken line at 7 in Fig. 3, and the stick releasing frame moved so that the bars 23 release the sticks 8 and drop them into the candy molds 2, as shown in solid line in Fig. 3. Cool air is now blown upon the mold frame, and passes into the interstices 4, thereby cooling the candy. After the candy has hardened, the stick frame is removed and the mold frame 18 is taken from the batch frame and inverted, upon a supporting surface, bringing the weight of the frame upon the heads of the sticks and forcing the candy pieces from their molds through the enlarged bottoms.

The mold frames in practice contain several thousand molds, and it can be readily seen that should an attempt be made to place the sticks in each of these molds by hand, before the final molds could be reached they would have so cooled as to make it impossible to insert the sticks. With the use of this invention, all of the sticks are inserted simultaneously and accurately at one operation.

While a specific form of the improvement has been described and illustrated herein, it is desired and understood that the same may be varied, within the scope of the appended claims, without departing from the spirit of the invention.

Having thus described the invention, what is claimed and desired secured by Letters Patent is:—

1. A candy making machine comprising a batch frame, said frame being open top and bottom; a mold frame carrying a plurality of molds adapted to set into said batch frame and a stick carrying frame arranged to be placed upon said batch frame and register a stick over the center of each of the molds in said mold frame, said stick carrying frame having means for holding said sticks suspended over said molds, said means being arranged to simultaneously release all of said sticks in said stick carrying frame.

2. A candy making machine comprising a batch frame, said frame being open top and bottom; a mold frame carrying a plurality of molds adapted to set into said batch frame and a stick carrying frame arranged to be placed upon said batch frame and register a stick over the center of each of the molds in said mold frame, said stick carrying frame having means for holding said sticks suspended over said molds, said means comprising end members slidably mounted on said stick carrying frame, cross members secured to said end members, each cross member being arranged to engage the side of a row of sticks; a spring acting on said members to hold said cross members in contact with said sticks, and a handle on each of said end members for manually drawing said cross members away from said sticks.

3. A candy making machine comprising a batch frame, said frame being open top and bottom; a mold frame carrying a plurality of molds adapted to set into said batch frame and a stick carrying frame arranged to be placed upon said batch frame and register a stick over the center of each of the molds in said mold frame, said molds comprising a series of cylinders open top and bottom, said cylinders being rigidly secured together and to the mold frame and a plate closing the interstices between said molds and said mold frame at the bottom thereof, said interstices being open at their tops.

4. A candy making machine having a series of molds, means for placing sticks simultaneously in all of said molds comprising a frame containing stick openings, each of said openings registering with one of said molds; a slidable frame mounted on said first mentioned frame and having resilient faced members adapted to contact with the sticks; a spring for causing said contact and means for sliding said slidably mounted frame out of contact with said sticks.

In testimony whereof, we affix our signatures.

LESTER McCOY.
GORDON WITZKE.